(12) United States Patent
Reluzco et al.

(10) Patent No.: US 6,206,629 B1
(45) Date of Patent: Mar. 27, 2001

(54) TURBINE BRUSH SEAL PROTECTION DEVICE AND METHOD

(75) Inventors: George Ernest Reluzco, Schenectady; Osman Saim Dinc, Troy; Norman Arnold Turnquist, Carlisle; Robert Harold Cromer, Johnstown, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/376,835

(22) Filed: Aug. 18, 1999

(51) Int. Cl.[7] ............................................. F01D 49/07
(52) U.S. Cl. ........................ 415/1; 415/174.2; 415/230; 416/174
(58) Field of Search ..................... 415/170.1, 174.2, 415/174.3, 172, 229, 230, 1; 416/174; 277/355, 421, 303

(56) References Cited

U.S. PATENT DOCUMENTS 4,781,388 * 11/1988 Wohrl et al. ..................... 277/172 R
5,613,829   3/1997 Wolfe et al. ..................... 415/174.1

* cited by examiner

Primary Examiner—Edward K. Look
Assistant Examiner—Hermes Rodriguez

(57) ABSTRACT

A turbine brush seal protection device includes an annular substrate having an outer periphery and defining a slot open at the outer periphery. The slot is for receiving a portion of an annular brush seal of a gas turbine subassembly during installation of a gas turbine and such that the annular substrate at least partially covers the annular brush seal of the gas turbine subassembly. The annular substrate at the outer periphery and within the slot thereof is removably mounted to a stationary portion of the gas turbine subassembly. A turbine brush seal protection method includes the steps of providing the annular substrate, placing the annular substrate over a portion of an annular brush seal of a gas turbine subassembly such that the seal portion is inside the slot of the annular substrate during installation of a gas turbine and the annular substrate at least partially covers the annular brush seal of the gas turbine subassembly, mounting the annular substrate at the outer periphery and within the slot thereof to a stationary portion of the gas turbine subassembly, and removing the annular substrate from the stationary portion of the gas turbine subassembly before completion of installation of the gas turbine subassembly.

20 Claims, 4 Drawing Sheets

TURBINE BRUSH SEAL PROTECTION DEVICE AND METHOD

BACKGROUND OF THE INVENTION

The present invention generally relates to turbine subassemblies and, more particularly, is concerned with a turbine brush seal protection device and method.

A gas turbine subassembly has a stator, a rotor and a brush seal of annular configuration attached to the stator. U.S. Pat. No. 5,613,829 to Wolfe et al., which is assigned to the same assignee as the present invention, discloses such a gas turbine subassembly.

The brush seal is generally installed before the rotor at an intermediate stage in the turbine assembling process. The brush seal surrounds the rotor after installation of the rotor. Typically, bristles of the brush seal are exposed while workers perform a variety of operations including heavy lifting in close proximity to the brush seal bristles. It is not uncommon for workers to walk inside the turbine casing and, possibly, to walk on the brush seal during installation of various turbine components. Damage to the bristles of the brush seal has been observed in turbine installations.

Though brush seals often have a coating of wax on the bristles, this does not provide adequate protection of the bristles during turbine installation. Currently, there is no known means for adequately protecting the bristles of brush seals during turbine installation. Consequently, a need exists for an innovation which will provide a solution to the aforementioned problem in the prior art without introducing any new problems in place thereof.

SUMMARY OF THE INVENTION

The present invention provides a turbine brush seal protection device and method designed to satisfy the aforementioned need. The turbine brush seal protection device and method of the present invention protects the brush seal bristles from damage during installation of the components of the gas turbine subassembly.

In an exemplary embodiment of the present invention, a turbine brush seal protection device comprises an annular substrate having an out periphery and defining a slot open at the outer periphery. The slot receives a portion of an annular brush seal of a gas turbine subassembly during installation of a gas turbine such that the annular substrate at least partially covers the annular brush seal of the gas turbine subassembly. The annular substrate at the outer periphery and within the slot thereof is removably mountable to a stationary portion of the gas turbine subassembly.

More particularly, the annular substrate in a first exemplary embodiment thereof has a substantially U-shaped configuration in cross-section and is spaced from the portion of the annular brush seal of the gas turbine subassembly such that a space exists between the annular substrate and the portion of the annular brush seal of the gas turbine subassembly. The annular substrate has a core comprised substantially of a first material and an enclosure comprised substantially of a second material and surrounding the core. The first material of the core of the annular substrate is rigid, such as metal, and the second material of the enclosure of the annular substrate is flexible, such as plastic.

The annular substrate in a second exemplary embodiment thereof has a substantially cylindrical configuration in cross-section. The annular substrate is disposed about and in contact with the portion of the annular brush seal of the gas turbine subassembly. The annular substrate is comprised substantially of an elastomer material. The slot of the annular substrate has an inner portion which substantially conforms to the shape of the portion of the annular brush seal of the gas turbine subassembly. The annular substrate in a third exemplary embodiment thereof has a substantially strip configuration in cross-section and comprised substantially of metal.

In another exemplary embodiment of the present invention, a turbine brush seal protection method comprises the steps of providing an annular substrate having an outer periphery and defining a slot open at the outer periphery, placing the annular substrate over a portion of an annular brush seal of a gas turbine subassembly such that the seal portion is disposed inside the slot of the annular substrate during installation of the gas turbine subassembly and the annular substrate at least partially covers the annular brush seal of the gas turbine subassembly, mounting the annular substrate at the inner periphery and within the slot thereof to a stationary portion of the gas turbine subassembly, and removing the annular substrate from the stationary portion of the gas turbine subassembly before completion of installation of the gas turbine subassembly. More particularly, the providing step includes providing the annular substrate in one of the three exemplary embodiments described above.

DETAILED DESCRIPTION OF THE INVENTION

Figure 1:
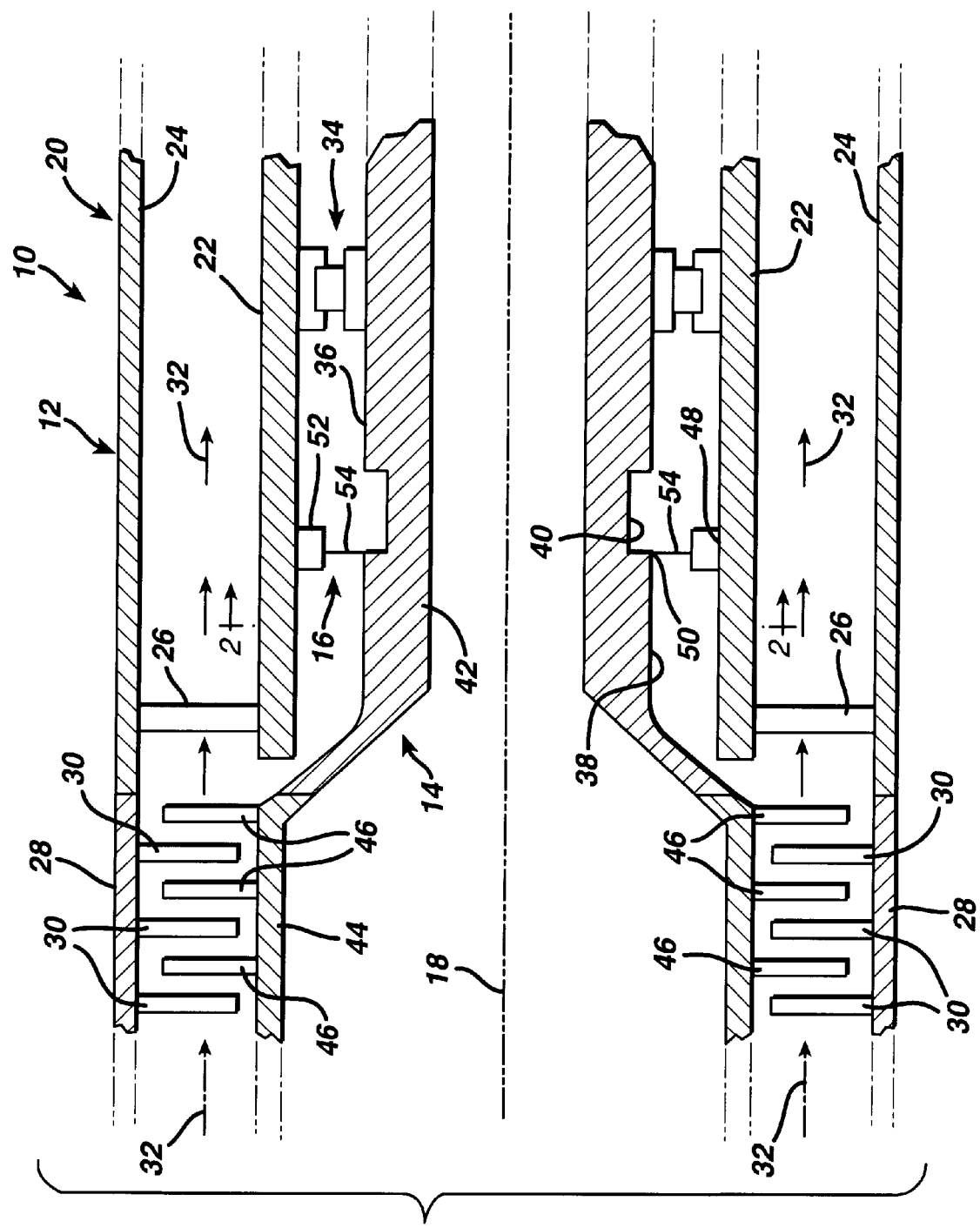
FIG. 1 is a schematic axial sectional view of a prior art gas turbine subassembly having a stator, a rotor and an annular brush seal attached to the stator.
Figure 2:
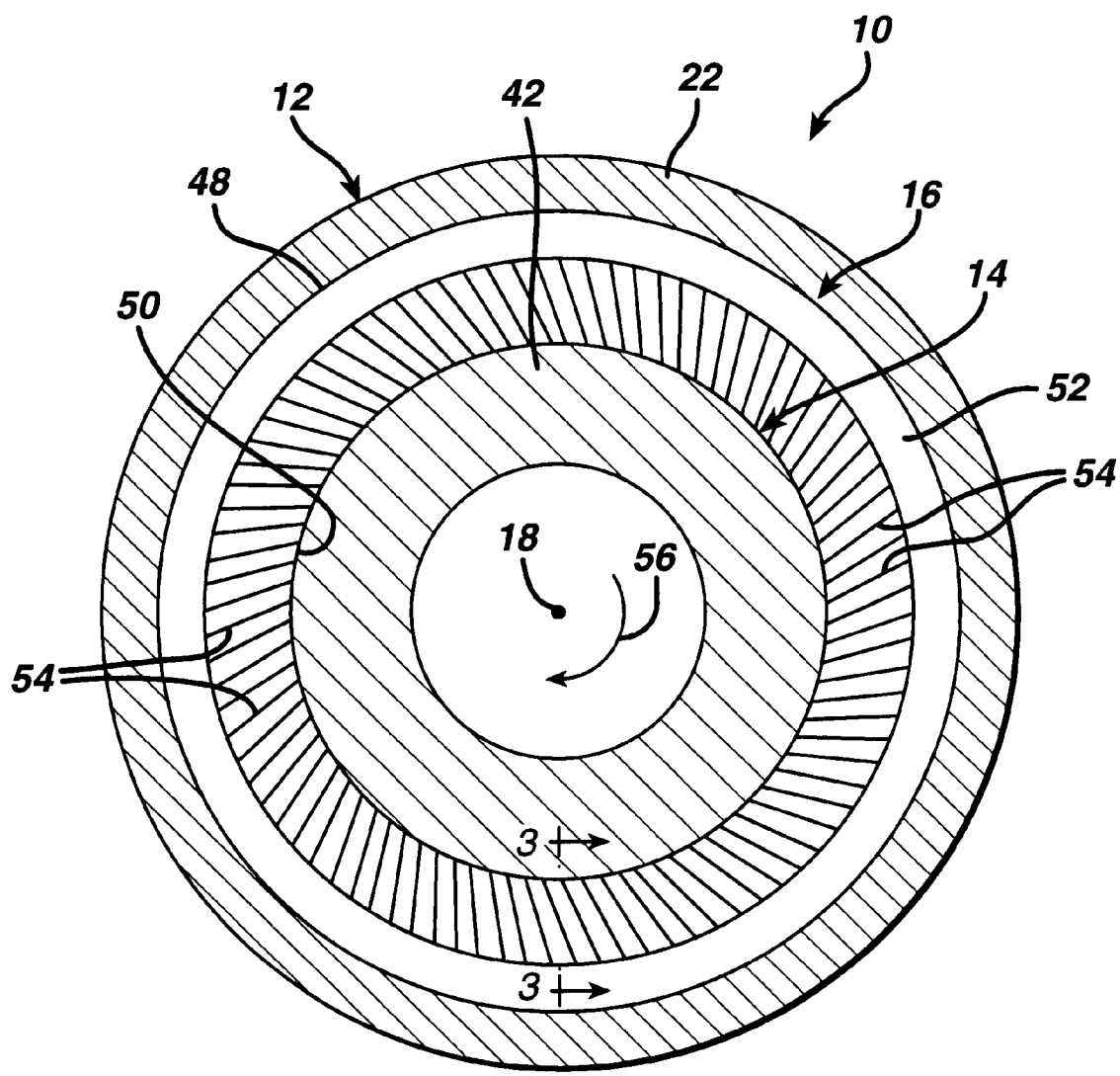
FIG. 2 is a schematic cross-sectional view of the prior art subassembly of FIG. 1 taken along line 2—2 of FIG. 1.

Referring to the drawings and particularly to FIGS. 1 and 2, there is illustrated a prior art gas turbine subassembly 10. The subassembly 10 basically includes a stator 12, a rotor 14 and a brush seal 16. The subassembly 10 is part of a complete gas turbine (not shown) such as a combustion-type gas turbine which utilizes combustion gases to turn the rotor 14 or a steam-type gas turbine which utilizes steam to run the rotor 14. Gas turbines are used to power aircraft, ships, tanks, pipeline pumps, electric generators, etc. For purposes of illustration, and not limitation, the subassembly 10 will be described hereinafter with particular reference to a power-plant gas turbine.

The stator 12 has a generally longitudinally extending axis 18. The stator 12 includes an annular transition duct 20 having radially inner and outer stator portions 22 and 24 and a circumferential row of outlet guide vanes 26 (only two of which are shown in FIG. 1) whose radially inner ends are attached to the radially inner stator portion 22 and whose radially outer ends are attached to the radially outer stator portion 24. The stator 12 further includes a compressor stator casing 28 attached to the radially outer stator portion 24 of the transition duct 20 and three circumferential rows of compressor stator vanes 30 depending radially inward from the compressor stator casing 28. The direction of gas flow (in this case air flow), as indicated by arrows 32, in the gas path of the gas turbine is from the compressor through the transition duct 20 to the combustor (not shown).

The rotor 14 has generally-steady-state first and second rotation/load states. The first rotation/load state is a full-speed/full-load state and the second rotation/load state is a turning-gear/no-load state. The full-speed/full-load state is self explanatory. The turning-gear/no-load state describes a gas turbine rotor 14 which is being rotated at a low idle speed by an auxiliary motor through a turning gear. Gas turbine rotors used in ships, aircraft, etc., have their own various steady-state rotation/load states, as is known to the artisan. The rotor 14 and the stator 12 together undergo a predetermined differential radial and longitudinal thermal movement when the rotor 14 undergoes a transition from the first rotation/load state to the second rotation/load state. Such differential movement can be calculated (or measured) for a particular gas turbine, as can be done by those of ordinary skill in the art.

The rotor 14 is generally coaxially aligned with and disposed radially within and spaced apart from the stator 12. The rotor 14 is rotatably attached to the stator 12 such as by rolling element bearings 34 (only one of which is shown in FIG. 1). The rotor 14 includes an outside surface 36 with longitudinally-extending and longitudinally-adjoining first and second circumferential portions 38 and 40. The first circumferential portion 38 has a manufactured first diameter which is generally constant over the longitudinal extent of the first circumferential portion 38. The second circumferential portion 40 has a manufactured second diameter which is everywhere smaller than the first diameter over the longitudinal extent of the second circumferential portion 40. The second circumferential portion 40 has a form of a groove in the outside surface 36 of the rotor 14. The second diameter may vary over the longitudinal extent of the groove. The rotor 14 has a transition rotor segment 42 associated with the transition duct 20, a compressor rotor segment 44 attached to the transition rotor segment 42, and three circumferential rows of compressor rotor blades 46 extending radially outward from the compressor rotor segment 44.

The brush seal 16 has a generally annular configuration. The brush seal 16 is generally coaxially aligned with the stator 12. The brush seal 16 has an attached end 48 and a free end 50. The attached end 48 of the brush seal 16 is attached to the stator 12. The free end 50 of the brush seal 16 extends inwardly from the stator 12 to the rotor 14. The brush seal 16 includes an attachment ring 52. The attached end 48 is part of the attachment ring 52, as shown in FIGS. 1 and 2. The brush seal 16 comprises a plurality of bristles 54 which preferably are tilted in the direction of rotation 56 of the rotor 14, as best shown in FIG. 2. The free end 50 of the brush seal 16 (i.e., the collective free ends of the bristles 54 of the brush seal 16) is disposed in general line-to-line contact with the first circumferential portion 38 of the outside surface 36 of the rotor 14 when the rotor 14 is in the first rotation/load state. The predetermined differential radial and longitudinal thermal movement includes the free end 50 of the brush seal 16 that moves radially inward and longitudinally across the second circumferential portion 40 of the outside surface 36 of the rotor 14. By "line-to-line" contact is meant that the free end 50 of the brush seal 16 just touches the first circumferential portion 38 of the outside surface 36 of the rotor 14 without any bending of (or other interference with) the brush seal 16. Proximate the brush seal 16 during the transition (from the first rotation/load state to the second rotation/load state), the stator 12 undergoes thermal contraction faster than the rotor 14 undergoes thermal contraction. The groove form of the second circumferential portion 40 of the outside surface 36 of the rotor 14 has a predetermined shape such that the free end 50 of the brush seal 16 does not contact the second circumferential portion 40 of the outside surface 36 of the rotor 14 during the transition.

Figure 3:
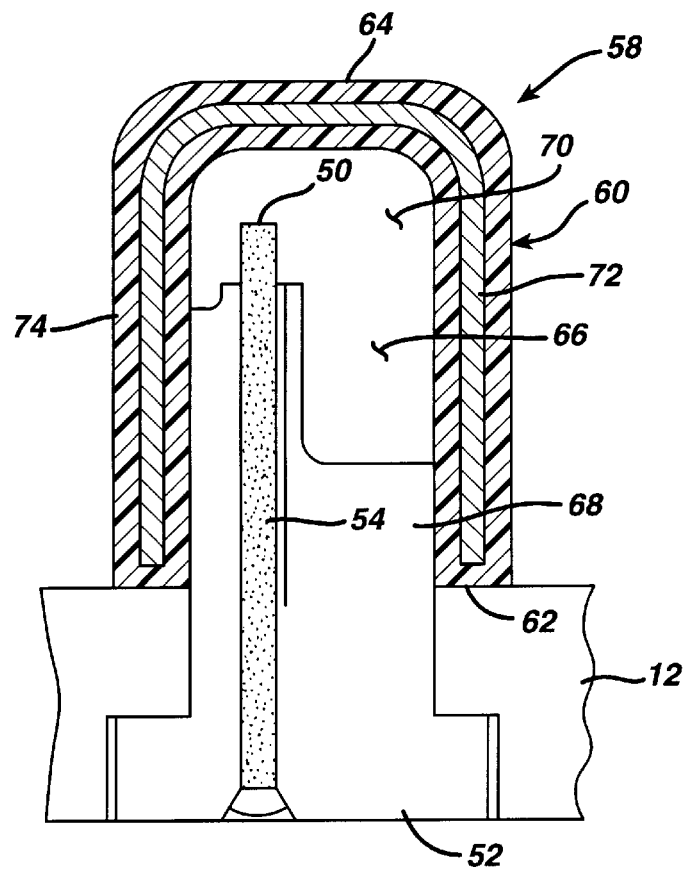
FIG. 3 is an enlarged fragmentary cross-sectional view of the turbine brush seal taken along line 3—3 of FIG. 2 and a cross-sectional view of a first exemplary embodiment of a turbine brush seal protection device of the present invention mounted to the stator and over the brush seal.
Figure 4:
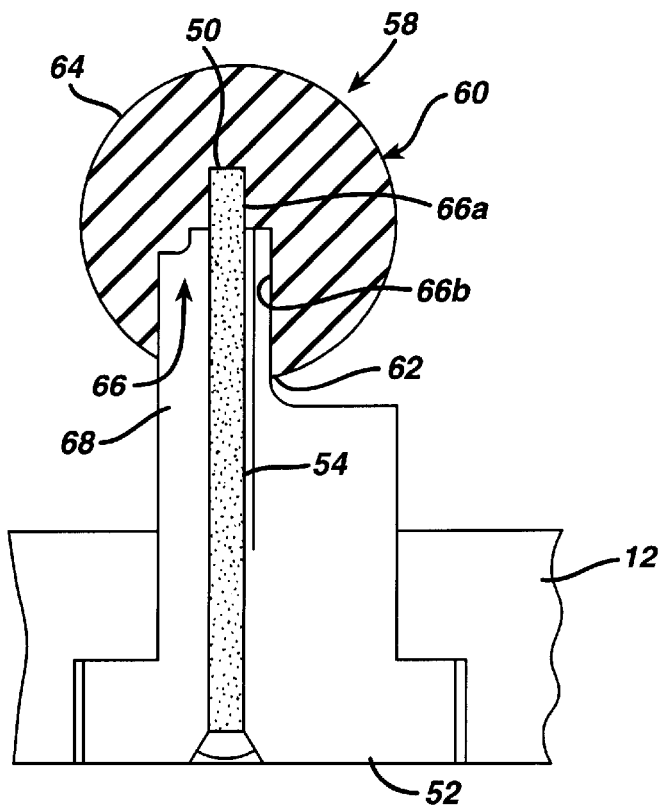
FIG. 4 is a cross-sectional view similar to that of FIG. 3 but showing a second exemplary embodiment of the turbine brush seal protection device.
Figure 5:
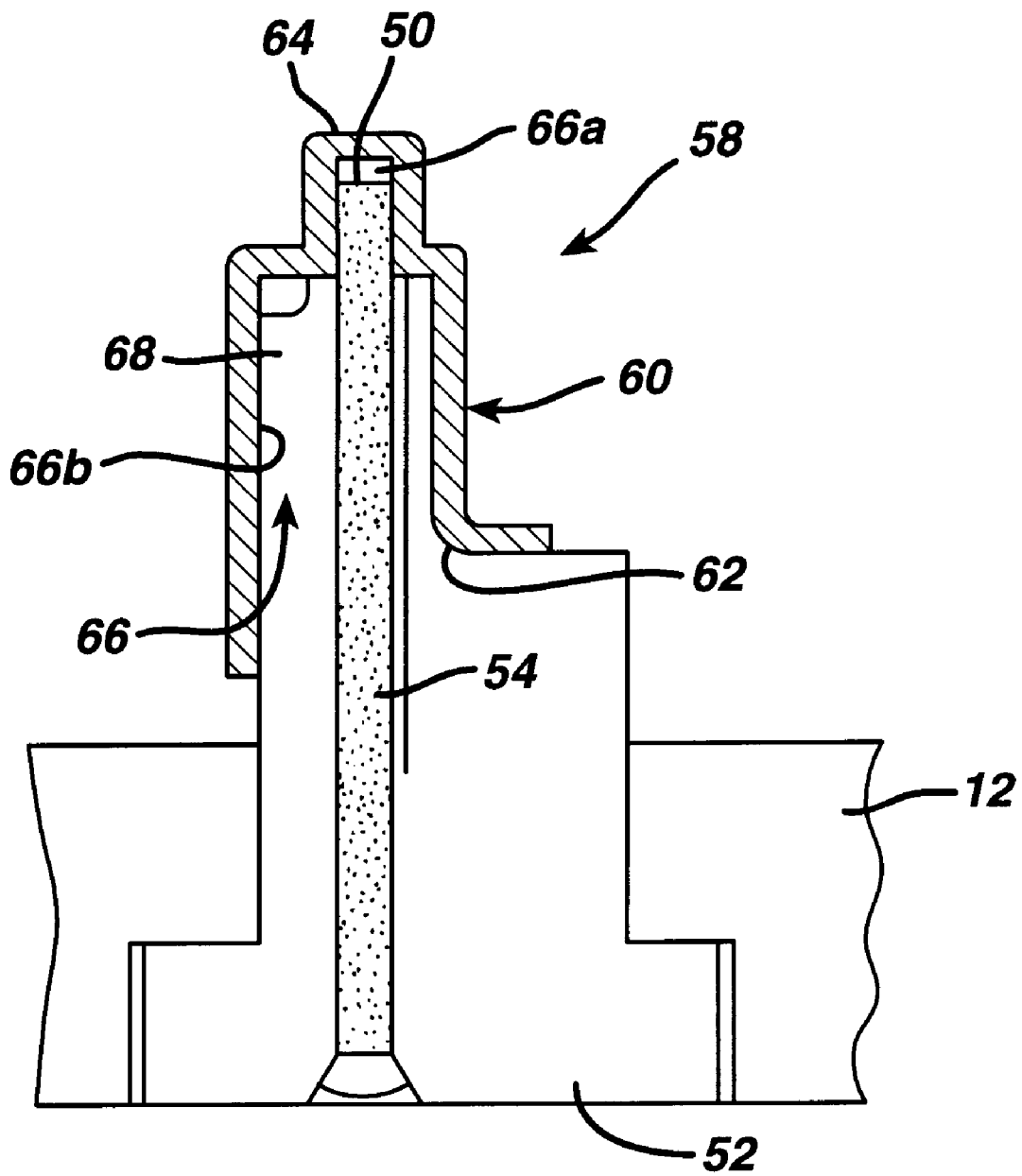
FIG. 5 is a cross-sectional view similar to that of FIG. 3 but showing a third exemplary embodiment of the turbine brush seal protection device.

Referring now to FIGS. 3 to 5, there is illustrated a turbine brush seal protection device, generally designated 58, of the present invention. The turbine brush seal protection device 58 can take the form of any one of three exemplary embodiments shown respectively in FIGS. 3, 4 and 5. In each embodiment, the turbine brush seal protection device 58 basically includes an annular substrate 60. The annular substrate 60 has an outer periphery 62 and an inner periphery 64. The annular substrate 60 defines an interior slot 66 open at the outer periphery 62 and closed at the inner periphery 64. The slot 66 is for receiving a portion, such as the bristles 54, of the annular brush seal 16 of the gas turbine subassembly 10 during installation of the gas turbine such that the annular substrate 60 at least partially covers the annular brush seal 16 of the gas turbine subassembly 10. The annular substrate 60 at the outer periphery 62 and within the slot 66 thereof is removably mounted via an interference fit to a stationary portion 68 of the gas turbine subassembly 10. The stationary portion 68 of the gas turbine subassembly 10 may be the attachment ring 52 of the brush seal 16 or may be an annular diaphragm 68 of the brush seal 16 which is disposed on opposite sides of and is interfitted with the attachment ring 52 of the brush seal 16.

In the first exemplary embodiment shown in FIG. 3, the annular substrate 60 has a generally U-shaped configuration in cross-section. The annular substrate 60 is spaced from the portion of the annular brush seal 16 of the gas turbine subassembly 10 such that a space 70 exists between the annular substrate 60 and the portion of the annular brush seal 16. The annular substrate 60 has a core 72 comprised of a first material and an enclosure 74 comprised of a second material. The enclosure 74 surrounds the core 72. The first material of the core 72 is rigid and, preferably, is substantially metal. The core 72 may be, particularly, comprised of a string of staple-like elements or the like. The core 72 gives the annular substrate 60 strength. The second material of the enclosure 74 is flexible and, preferably, is plastic or may also be vinyl. Each of the core 72 and the enclosure 74 has a substantially U-shaped configuration in cross-section which generally conforms to the overall configuration of the annular substrate 60. The annular substrate 60 at the inner periphery 62 and along the enclosure 74 is, particularly, mounted to the annular diaphragm 68 of the annular brush seal 16. The annular substrate 60 within the slot 66 and along the enclosure 74 abuts against the attachment ring 52 of the annular brush seal 16.

In the second exemplary embodiment shown in FIG. 4, the annular substrate 60 has a substantially cylindrical configuration in cross-section. The annular substrate 60 is disposed against the portion of the annular brush seal 16 of the gas turbine subassembly 10 such that no space exists between the annular substrate 60 and the portion of the annular brush seal 16. The annular substrate 60 is comprised substantially of an elastomer material. The annular substrate 60 is in the form of an encapsulate with the elastomer material being removable. The slot 66 of the annular substrate 60 has an inner portion 66a and an outer portion 66b.

The inner portion 66a of the slot 66 substantially conforms to a shape of the portion of the annular brush seal 16, such as to a collection of bristles 54 of the brush seal 16. The outer portion 66b of the slot 66 substantially conforms to a shape of a portion of the attachment ring 52 of the brush seal 16. The annular substrate 60 within the slot 66 is, particularly, mounted to the attachment ring 52 of the brush seal 16.

In the third exemplary embodiment shown in FIG. 5, the annular substrate 60 has a substantially strip configuration in cross-section. As in the second exemplary embodiment, the annular substrate 60 is disposed about and in contact with the portion of the annular brush seal 16 of the gas turbine subassembly 10 such that no space exists between the annular substrate 60 and the portion of the annular brush seal 16. The annular substrate 60 is comprised substantially of metal. Also, as in the second exemplary embodiment, the slot 66 of the annular substrate 60 has an inner portion 66a and an outer portion 66b. The inner portion 66a of the slot 66 conforms substantially to the shape of the portion of the annular brush seal 16, such as to the collection of bristles 54 of the brush seal 16. The outer portion 66b of the slot 66 substantially conforms to a shape of a portion of the attachment ring 52 of the brush seal 16. The annular substrate 60 at the outer portion 66b of the slot 66 covers a greater portion of the attachment ring 52 in the third exemplary embodiment than in the second exemplary embodiment thereof. The annular substrate 60 within the slot 66 is, particularly, mounted to the attachment ring 52 of the brush seal 16, such as by being tacked in place.

The turbine brush seal protection method includes the steps of providing the annular substrate 60 having the above-described outer periphery 62 and defining the slot 66 open at the outer periphery 62, placing the portion, including the bristles 54, of the annular brush seal 16 of the gas turbine subassembly 10 inside the slot 66 of the annular substrate 60 during installation of the gas turbine such that the annular substrate 60 at least partially covers the annular brush seal 16 of the gas turbine subassembly 10, mounting the annular substrate 60 at the inner periphery 62 and within the slot 66 to the stationary portion 68 of the gas turbine subassembly 10, and removing the annular substrate 60 from the stationary portion 68 of the gas turbine subassembly 10 before completion of the installation of the rotor 14 of the gas turbine subassembly 10.

The providing step, in the first exemplary embodiment, includes providing the annular substrate 60 with the substantially U-shaped configuration in cross-section and the annular substrate 60 with the core 72 comprised substantially of the first material and the enclosure 74 comprised substantially of the second material and surrounding the core 72 and the first material of the core 72 of the annular substrate 60 being rigid and the second material of the enclosure 74 of the annular substrate 60 being flexible, as shown in FIG. 3. The providing step, in second exemplary embodiment, includes providing the annular substrate 60 with the cylindrical configuration in cross-section and the slot 66 of the annular substrate 60 with the inner portion 66a which substantially conforms to the shape of the portion of the annular brush seal 16 of the gas turbine subassembly 10. The providing step, in the third exemplary embodiment, includes providing the annular substrate 60 with a strip configuration in cross-section and the slot 66 of the annular substrate 60 with an inner portion 66a which substantially conforms to the shape of the portion of the annular brush seal 16 of the gas turbine subassembly 10.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

What is claimed is:

1. A turbine brush seal protection device, comprising:
an annular substrate having an outer periphery and defining a slot open at said outer periphery, said slot for receiving a portion of an annular brush seal of a gas turbine subassembly during installation of a gas turbine such that said annular substrate at least partially covers the annular brush seal of the gas turbine subassembly;
said annular substrate at said outer periphery and within said slot thereof being removably mountable to a stationary portion of the gas turbine subassembly.

2. The device of claim 1 in which said annular substrate has a substantially U-shaped configuration in cross-section.

3. The device of claim 2 in which said annular substrate is spaced from the portion of the annular brush seal of the gas turbine subassembly such that a space exists between said annular substrate and the portion of the annular brush seal of the gas turbine subassembly.

4. The device of claim 2 in which said annular substrate has a core comprised substantially of a first material and an enclosure comprised substantially of a second material and surrounding said core.

5. The device of claim 4 in which said first material of said core of said annular substrate is rigid and said second material of said enclosure of said annular substrate is flexible.

6. The device of claim 4 in which said first material of said core of said annular substrate is metal and said second material of said enclosure of said annular substrate is plastic.

7. The device of claim 1 in which said annular substrate has a substantially cylindrical configuration in cross-section.

8. The device of claim 7 in which said annular substrate is disposable about and in contact with the portion of the annular brush seal of the gas turbine subassembly.

9. The device of claim 7 in which said annular substrate is comprised substantially of an elastomer material.

10. The device of claim 7 in which said slot of said annular substrate has an inner portion which substantially conforms to a shape of the portion of the annular brush seal of the gas turbine subassembly.

11. The device of claim 1 in which said annular substrate has a substantially strip configuration in cross-section.

12. The device of claim 11 in which said annular substrate is disposed about and in contact with the portion of the annular brush seal of the gas turbine subassembly.

13. The device of claim 11 in which said annular substrate is comprised substantially of metal.

14. The device of claim 11 in which said slot of said annular substrate has an inner portion which substantially conforms to a shape of the portion of the annular brush seal of the gas turbine subassembly.

15. A method for protecting a turbine brush seal, the method comprising the steps of:
providing an annular substrate having an outer periphery and defining a slot open at the outer periphery;
placing the annular substrate over a portion of an annular brush seal of a gas turbine subassembly such that the seal portion is disposed inside the slot of the annular substrate during installation of a gas turbine and the annular substrate at least partially covers the annular brush seal of the gas turbine subassembly;
mounting the annular substrate at the outer periphery and within the slot thereof to a stationary portion of the gas turbine subassembly; and removing the annular substrate from the stationary portion of the gas turbine subassembly before completion of installation of the gas turbine subassembly.

16. The method of claim 15 in which the providing step includes providing the annular substrate with a substantially U-shaped configuration in cross-section.

17. The method of claim 16 in which the providing step includes providing the annular substrate with a core comprised substantially of a first material and an enclosure comprised substantially of a second material and surrounding the core.

18. The method of claim 17 in which the first material of the core of the annular substrate is rigid and the second material of the enclosure of the annular substrate is flexible.

19. The method of claim 15 in which the providing step includes providing the annular substrate with a substantially cylindrical configuration in cross-section and the slot of the annular substrate with an inner portion which substantially conforms to a shape of the portion of the annular brush seal of the gas turbine subassembly.

20. The method of claim 15 in which the providing step includes providing the annular substrate with a substantially strip configuration in cross-section and the slot of the annular substrate with an inner portion which substantially conforms to a shape of the portion of the annular brush seal of the gas turbine subassembly.

* * * * *